Dec. 18, 1945.　　　A. M. CARTER　　　2,391,224
APPARATUS FOR LIFTING AND TRANSFERRING MATERIALS
Filed Aug. 10, 1944　　　3 Sheets-Sheet 1

Dec. 18, 1945. A. M. CARTER 2,391,224
APPARATUS FOR LIFTING AND TRANSFERRING MATERIALS
Filed Aug. 10, 1944 3 Sheets-Sheet 3

Inventor
A. M. Carter,
By [signature]
Attorney

Patented Dec. 18, 1945

2,391,224

UNITED STATES PATENT OFFICE 2,391,224

APPARATUS FOR LIFTING AND TRANSFERRING MATERIALS

Alfred Miller Carter, Galion, Ohio, assignor to Carter Machine Company, Ltd., a partnership Application August 10, 1944, Serial No. 548,866

2 Claims. (Cl. 214—140)

This invention relates to material lifting and transferring apparatus, and has particular reference to a material-loading mechanism of the type adapted for mounting on an automotive base vehicle and operating to elevate and transfer loose bulk material from ground level to the bodies of transport vehicles, or other elevated positions of deposit.

It is an object of the invention to provide loading mechanism formed for attachment to the front end of a tractor, or other form of automotive vehicle, and wherein the mechanism embodies a novel lever system composed of pivotally supported and relatively movable arms arranged in parallelogram order, the said arms supporting at their outer ends a load carrier, the said arms carrying a fluid-actuated telescoping jacket which upon expansion and contraction alters the relative arrangement of said arms in such manner as to raise and lower the load carrier and maintain its normally horizontal position during such movement thereof.

It is another object of the invention to provide a material-loading attachment for automotive tractors which may be readily mounted upon or demounted from the associated tractor so that the latter may be employed in various capacities when the loading apparatus is not in use.

For a further understanding of the invention, reference is to be had to the following description and the accompanying drawings, wherein.

Figure 1:
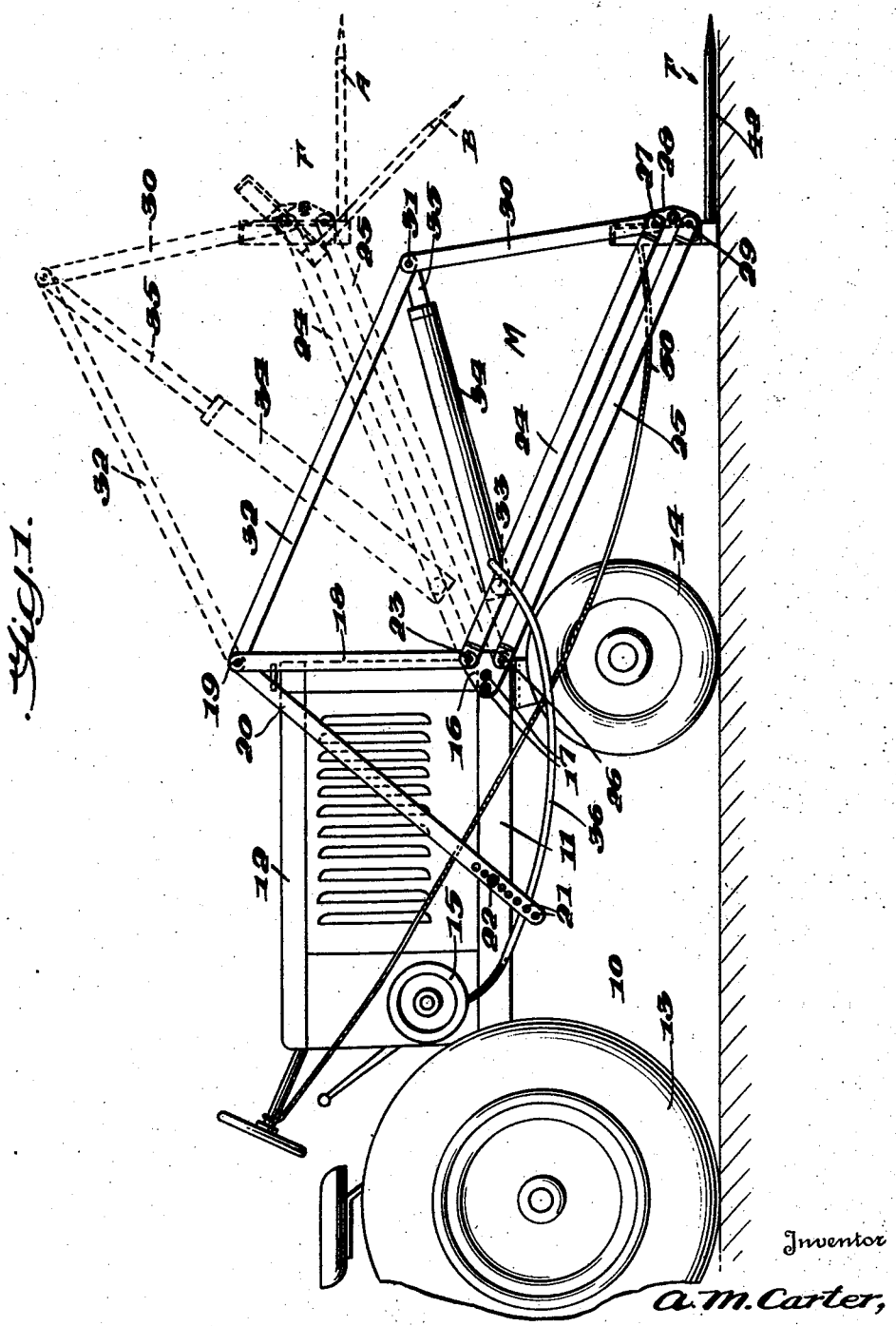
Fig. 1 is a side elevational view of a tractor equipped with the material loading and elevating apparatus forming the present invention.
Figure 2:
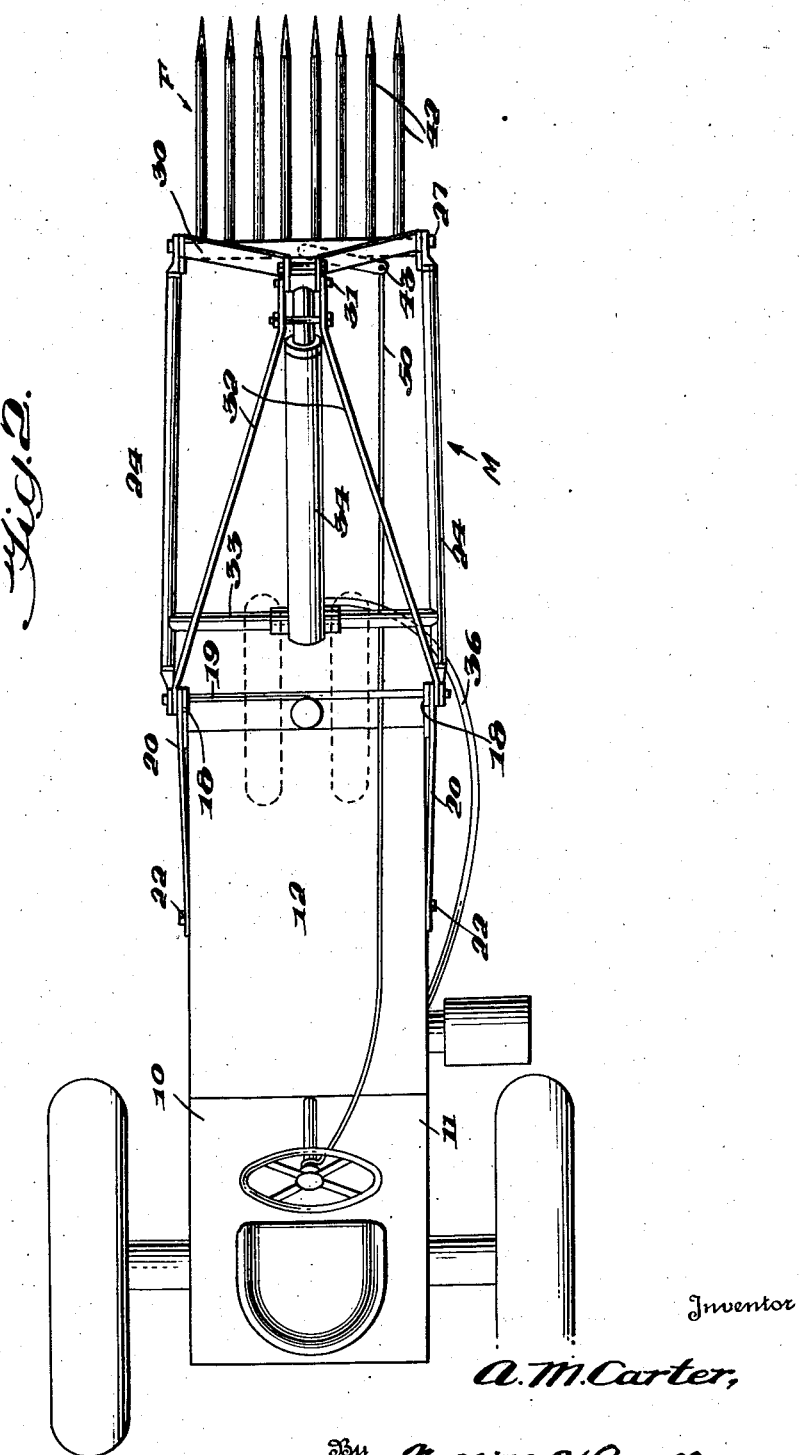
Fig. 2 is a top plan view thereof.

Referring more particularly to the drawings, the numeral 10 designates an engine propelled tractor vehicle, the same being of any suitable design, having a frame 11, a power plant 12, driving wheels 13 and forwardly disposed steering wheels 14. As usual, the tractor is equipped with an engine-driven pump 15 and fluid under pressure discharged from this pump and utilized by the present invention of a material gathering, elevating and discharging mechanism M, as hereinafter defined.

In a preferred embodiment, the mechanism M comprises a pair of brackets 16 which are bolted or otherwise removably secured as at 17 to the forward end of the tractor frame 11. These brackets carry a pair of upstanding transversely spaced vertical arms 18 which have their upper ends united by a transversely extending horizontal rod 19. The arms are held in their upright position by rearwardly and diagonally extending reach links 30, which are disposed on opposite sides of the power plant 12 and have their lower ends perforated at longitudinal intervals, as at 21, to receive attaching bolts 22 carried by the frame 11, the perforations 21 permitting of adjustment of the links 20 in order to vary the operative positions of the rod 19 carried by the upper ends of the arms 18.

The lower ends of the arms 18 are pivotally mounted on studs 23 carried by the brackets 16, whereby said arms may rock about the axes of the studs on adjustment of the links 20. The outer portions of the studs 23 serve as fulcrums for the pivotal support of the inner ends of an upper pair of tubular arms 24, the latter being arranged in parallel relation with and immediately adjacent to a corresponding lower pair of tubular arms 25. The arms 25 have their inner ends pivotally mounted as at 26 on the brackets 16 at positions immediately below the studs 23. The outer ends of the upper pair of arms 24 are pivotally connected as at 27 to a pair of plates 28 and, likewise, the outer ends of the lower pair of arms 25 are pivotally connected as at 29 to the plates 28 immediately beneath the pivots 27. These pivots are also united with the lower ends of a yoke 30, and the inwardly converging upper portions of this yoke are united by a cross rod 31. Also, connected with the rod 31 are the forward converging ends of a triangular frame 32, the rear ends of this frame having pivotal anchorage and support on the rod 19.

The upper pair of arms 24 carries a transversely extending member 33 upon which is pivotally mounted the inner or lower end of a fluid-receiving cylinder 34, the latter carrying a telescopic ram or plunger 35, the outer end of the latter having pivotal bearing on and in connection with the cross rod 31. A length of flexible tubing 36 extends from the pump 15 of the tractor power plant to the lower end of the cylinder 34, whereby when the pump is actuated, fluid is forced under pressure into the cylinder 34 to project the ram or plunger 35 thereof forwardly and outwardly. The force thus exerted on the parallelogram lever system, occupying the full line position disclosed in Fig. 1, causes said lever system, through distribution of force components, to assume the elevated or dotted line position indicated in Fig. 1. By discontinuing the operation of the pump and manual return valve, not shown, the lever system or frame may return gravitationally from its elevated to its lowered position, this return movement being under the control of the fluid flowing out of the bottom of the cylinder 34 through the tubing 36 and thence to the fluid reservoir of the pump.

While various types of material or load carriers may be provided on the front end of the lever frame, such as scoops, forks or platforms, depending upon the nature of the materials to be handled, nevertheless the accompanying drawings illustrate a fork structure F suitable for the gathering and loading of hay or other similar materials. This fork structure comprises a transversely extending metallic bolster member 37, having welded or otherwise secured thereto end plates 38. These plates are pivotally connected as at 39 to the plates 28 in order that the fork structure may oscillate bodily about a horizontal axis provided by the pivot 39. Carried by the rear and lower edge portions of the bolster member is a boxing 40, the walls of the latter being formed with a series of registering and longitudinally spaced openings in which are received the diametrically reduced inner ends 41 of a plurality of forwardly projecting, relatively spaced and parallel tine elements. The inner ends 41 of these elements, while they project beyond the boxing 40, may be provided with openings for the reception of movable cotter keys.

Figure 3:
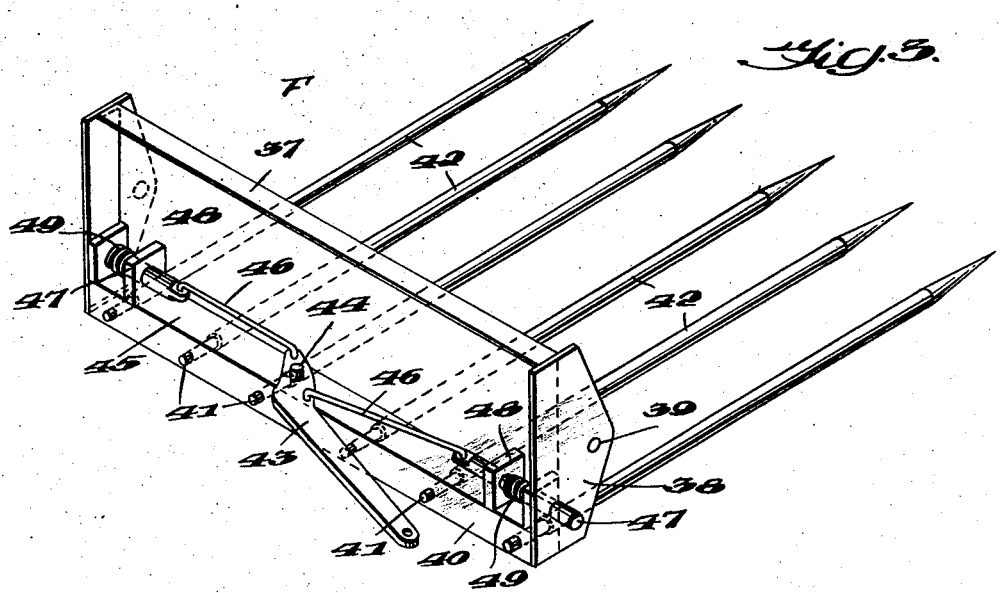
Fig. 3 is a perspective view of a load carrier adapted for use in connection with the apparatus.
Figure 4:
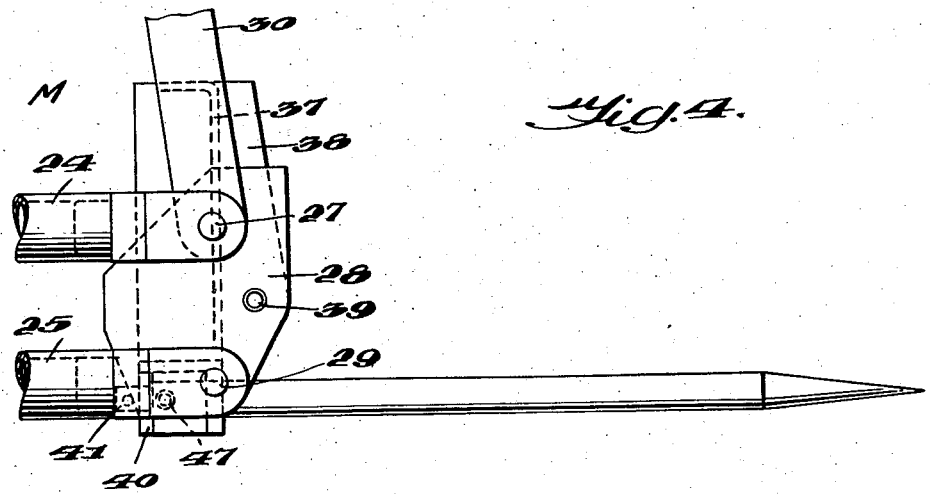
Fig. 4 is a fragmentary side elevational view of the load carrier and its associated supporting elements.

Normally, rotation of the fork structure about the pivots 39 is precluded by the provision of a manually controlled latch mechanism. This latch mechanism, as shown more particularly in Fig. 3, may comprise a lever 43 which is pivotally mounted on an upstanding stud 44 stationarily carried by the horizontal upper surface 45 of the boxing 40. On opposite sides of the stud 44, the lever 33 has connected therewith the inner ends of a pair of rods 46, the outer ends of these rods being down-turned and received within openings provided in the inner ends of a pair of sliding bolts 47. These bolts are slidably mounted in stationary lugs 48 arising from the boxing and, if desired, are provided with coil springs 49 which tend to force the bolts outwardly so that their outer ends will pass through registering openings provided in the plates 28 and 38, thus locking the fork structure against rocking movement. The outer end of the lever 43 may be joined with a flexible cable 50 which leads to the operator's position of the tractor vehicle.

In the use of the apparatus, with the loading attachment in its lowered position, as shown in full lines in Fig. 1, and with the fork structure resting on or near the ground, the tractor vehicle is moved forwardly to cause the penetration of the fork structure or other load carrier into the material to be loaded. While so engaged with a load to substantially its fullest capacity, the pump mechanism 15 is operated to introduce a fluid under pressure into the cylinder 34. If the cylinder possesses an internal diameter of three inches, or seven square inches of piston area and the fluid pressure applied thereto is of the order of 500 pounds per square inch, the effective force developed on the piston will amount to 3500 pounds, thus developing an effective lifting force on the yoke 30 and the fork structure F of a value of 1220 pounds following deduction of necessary loss components in a lever system of this category. These calculations are of course illustrative and are not to be employed in a limiting sense.

As a result of the parallelogram characteristics of the lever system, the fork structure, during raising movement thereof, maintains its normal horizontal plane, preventing loss of materials handled thereby as a result of undesired tipping. However, when the fork structure has been elevated to the desired extent within the working limits of the lever system and, by manipulation of the tractor vehicle positioned over the body of a transporting vehicle, the latch mechanism is operated to release the fork structure. This is accomplished through the use of the cable 50 which extends to the operator's position of the tractor vehicle, and which, when tightened, will rock the lever 43 to withdraw the outer ends of the bolts 47 from the receiving openings therefor provided in the arm plates 28. Since the fork structure is unbalanced, the same will rock from the position disclosed at A in Fig. 1 to the position indicated at B. When in this latter position, the materials supported by the fork structure gravitate into the body of an associated transport vehicle or may be deposited on any other elevated supporting base. The fork structure may then be returned to its initial loading position and, as stated previously, the controlled descent of the apparatus takes place as the result of the outflow of liquid from the lower end of the cylinder 34. When on the ground, the fork structure may be relatched to the arm plates 28.

It will be observed that the entire loading mechanism may be mounted as an attachment on a tractor or other automotive vehicle 10 without any substantial alterations in or additions to the usual structure of the vehicle. Conversely, when the loading mechanism is not in use, the same may be detached with corresponding convenience from the tractor vehicle, permitting the latter to be used in any other desired capacity. The mechanism is characterized by its high mechanical strength, inherent simplicity, low manufacturing costs and the ease and facility with which the same may be employed in practice.

While the preferred form of the invention has been illustrated and described in detail, nevertheless, it will be understood that the same is subject to certain variation and modification without departure from the spirit and scope of the invention as the same have been defined in the following claims.

I claim:

1. A material gathering and elevating attachment for automotive tractors, comprising bracket means detachably secured to the front end of a frame of such a tractor, a pair of forwardly extending arms arranged at each side of the tractor, pivotal connections uniting the rear ends of said arms with said bracket means, upright arms pivotally secured at their lower ends to said bracket means, reach links joined with the upper ends of said upright arms, the lower ends of said reach links being secured to the associated tractor frame, a yoke pivotally connected at its lower ends with the outer end portions of said forwardly extending arms, a frame disposed in parallel relation with said forwardly extending arms, the rear ends of said last-named frame being pivotally connected with the upper ends of said upright arms and the outer ends thereof with the upper ends of said yoke, a fluid-actuated extensible jack mechanism comprising a cylinder and a movable plunger, pivotal means uniting the inner ends of said cylinder with said forwardly extending arms adjacent to their points of connection with said bracket means, a pivotal connection uniting the outer end of the movable plunger with the upper end portions of said yoke and the outer end portions of the last-named frame, and a load receiver carried in connection with the outer ends of said forwardly projecting arms.

2. A material gathering and elevating attachment for automotive tractors, comprising bracket means detachably secured to the front end of a frame of such a tractor, a pair of forwardly extending arms arranged at each side of the tractor, pivotal connections uniting the rear ends of said arms with said bracket means, upright arms pivotally secured at their lower ends to said bracket means, reach links joined with the upper ends of said upright arms, the lower ends of said reach links being secured to the associated tractor frame, a yoke pivotally connected at its lower ends with the outer end portions of said forwardly extending arms, a frame disposed in parallel relation with said forwardly extending arms, the rear ends of said last-named frame being pivotally connected with the upper ends of said upright arms and the outer ends thereof with the upper ends of said yoke, a fluid-actuated extensible jack mechanism comprising a cylinder and a movable plunger, pivotal means uniting the inner ends of said cylinder with said forwardly extending arms adjacent to their points of connection with said bracket means, a pivotal connection uniting the outer end of the movable plunger with the upper end portions of said yoke and the outer end portions of the last-named frame, a load receiver carried in connection with the outer ends of said forwardly projecting arms, a pivotal connection uniting said receiver with the outer ends of said forwardly projecting arms to admit of rocking movement of said receiver relative to said arms, and a manually operated latch mechanism normally restraining the receiver against rocking movement.

ALFRED MILLER CARTER.